US008223677B2

(12) United States Patent
McCamon

(10) Patent No.: US 8,223,677 B2
(45) Date of Patent: Jul. 17, 2012

(54) SYSTEM AND METHOD FOR MANAGING RADIO SYSTEMS

(75) Inventor: Michael G. McCamon, Overland Park, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1172 days.

(21) Appl. No.: 11/708,216

(22) Filed: Feb. 20, 2007

(65) Prior Publication Data

US 2008/0200166 A1 Aug. 21, 2008

(51) Int. Cl.
*G08C 17/00* (2006.01)

(52) U.S. Cl. .................. 370/311; 455/422.1; 455/426.1; 455/552.1; 455/561; 455/435.3

(58) Field of Classification Search .................. 370/311; 455/422.1, 426.1, 552.1, 561, 553.1, 435.2, 455/435.3

See application file for complete search history.

(56) References Cited

U.S. PATENT DOCUMENTS

| 2005/0079817 | A1* | 4/2005 | Kotola et al. | ................. 455/41.2 |
| 2006/0265491 | A1* | 11/2006 | Litwin | .......................... 709/224 |
| 2007/0082716 | A1* | 4/2007 | Behzad et al. | ................. 455/574 |
| 2007/0149184 | A1* | 6/2007 | Viegers et al. | ............. 455/422.1 |
| 2008/0181155 | A1* | 7/2008 | Sherman et al. | .............. 370/311 |

* cited by examiner

*Primary Examiner* — Justin Lee
(74) *Attorney, Agent, or Firm* — PattonBoggs LLP

(57) ABSTRACT

A system and method for switching between radio systems of a wireless device. The wireless device may include a first radio, a second radio, and a third radio. The radios may be configured to communicate using a first, a second, and a third communications protocol, respectively. Circuitry in communication with the radios may be configured to activate the first radio when a signal using the second communications protocol is not detected and to switch activation of the first radio to the third radio in response to detecting a signal using the second communications protocol.

7 Claims, 6 Drawing Sheets

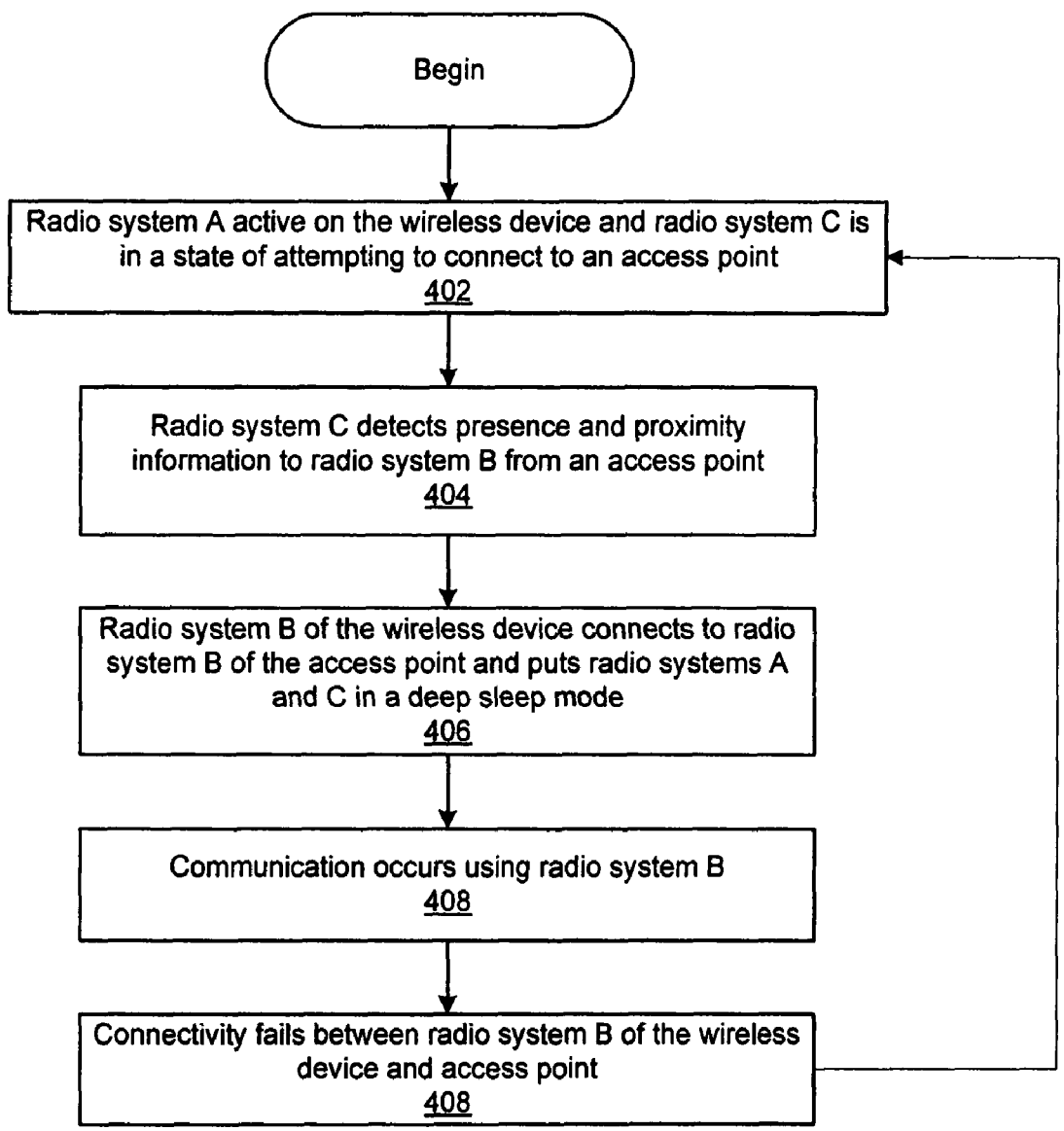

SYSTEM AND METHOD FOR MANAGING RADIO SYSTEMS

BACKGROUND

Wireless communications has grown nearly exponentially in recent years. The growth is fueled by larger networks with more reliable protocols and better communications hardware available to service providers and consumers. In addition to better hardware, new and improved protocols have made different types of wireless communications available from numerous sources. For example, WiFi® and WiMAX® communications are used by many wireless devices which include cell phones, PDA's, laptops, cameras, digital music players, vehicles, and other communication elements.

Many new wireless devices, cell phones in particular, are dual-mode or multi-mode. Multi-mode cell phones are configured to communicate using multiple communication protocols to allow communication with multiple traditional cellular networks, such as communicate via code division multiple access (CDMA), global system for mobile communications (GSM), time division multiple access (TDMA) wireless networks, and analog networks. Additionally, multi-mode phones facilitate communication with wireless local area networks and wide area networks, such as WiFi. Using a cellular communication protocol and other high-power wireless protocols, such as WiFi, simultaneously to determine if a WiFi communication access point is locally available requires large amounts of power that quickly drain a battery of a cell phone. As a result, many multi-mode phones do not switch between communications protocols efficiently or conveniently enough to conserve battery power.

In many cases, the user of a multi-mode cell phone may be required to manually activate a WiFi feature just to determine if a wireless 802.11 network is available. Furthermore, the user may be required to manually switch between wireless modes in order to effectively communicate using available networks. Although convenient, the enhanced communications abilities of multi-mode wireless devices are marred by inefficient switching between communications protocols and limited battery power. While inefficient switching between communication protocols is a problem with multi-mode telephones, a similar battery power drainage problem exists with laptop computers that use a high-power communication protocol and continuously or intermittently search for local access points.

SUMMARY

To conserve battery power and switch efficiently between communications protocols, a wireless device, system and method for managing radio systems has been developed to include a low power radio to detect a signal indicative of a higher power local access point to which the wireless device may communicate. One embodiment includes a wireless device that includes a first radio, a second radio, and a third radio. The radios may be configured to communicate using a first, a second, and a third communications protocol, respectively. Circuitry in communication with the radios may be configured to activate the first radio when a signal using the second communications protocol is not detected and to switch activation of the first radio to the third radio in response to detecting a signal using the second communications protocol.

Another embodiment includes a method for a wireless device to switch between communication protocols. The wireless device may communicate using a first communication protocol signal. A second communications protocol may be used to listen for a signal to determine if the wireless device is within range of a third communications protocol signal. The signal is detected using the second communications protocol signal. In response to detecting a signal using the second communications protocol, a third communications protocol signal may be activated.

BRIEF DESCRIPTION OF THE DRAWINGS

Illustrative embodiments of the present invention are described in detail below with reference to the attached drawing figures, which are incorporated by reference herein and wherein:

FIG. 4 is a flowchart of an exemplary process for switching between communications protocols in accordance with the illustrative embodiments of the present invention;

DETAILED DESCRIPTION OF THE DRAWINGS

Figure 1:
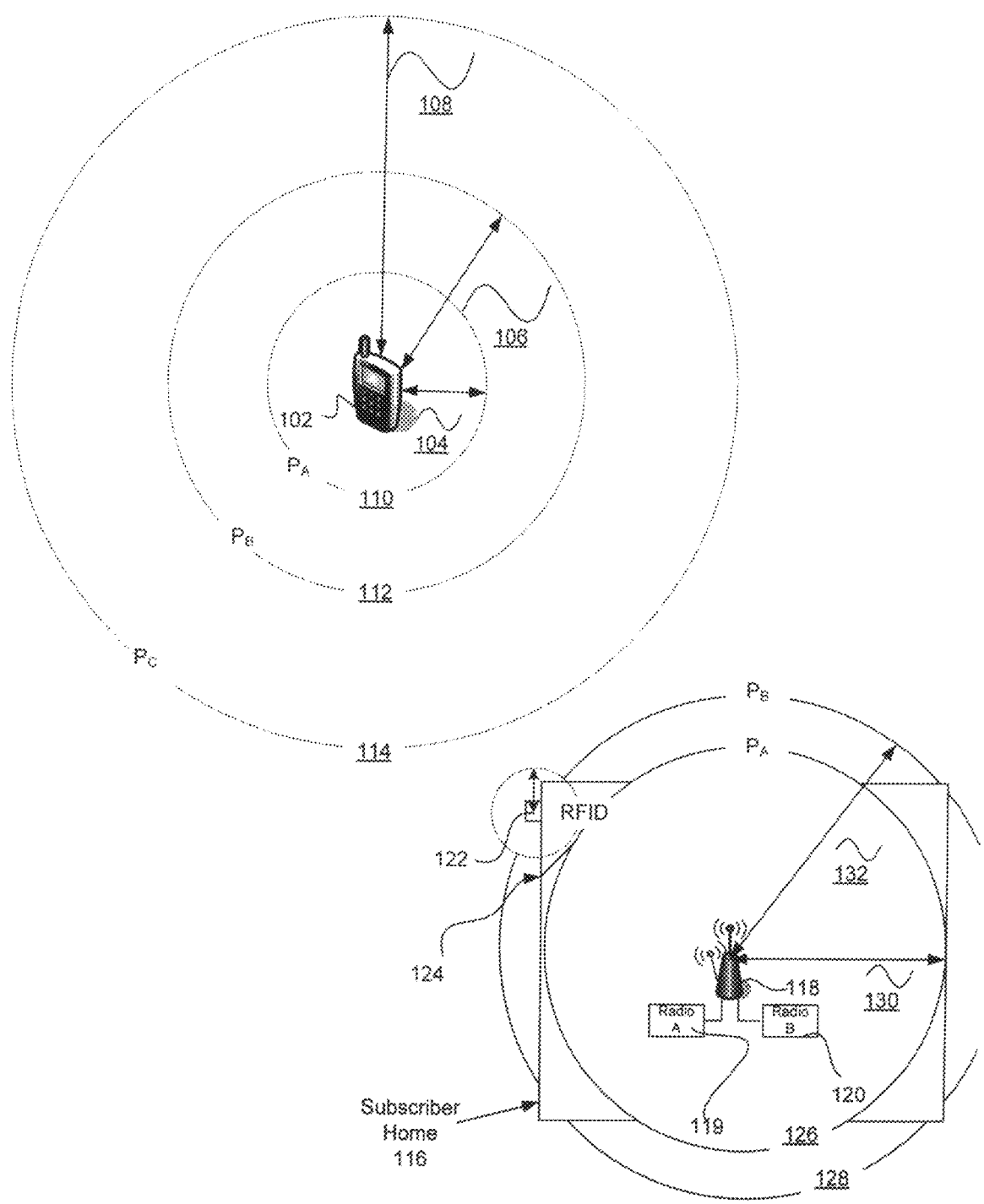
FIG. 1 is a pictorial representation of an exemplary wireless communications system in accordance with the illustrative embodiments of the present invention.

The illustrative embodiments of the present invention provide a system and method enabling a wireless device to use a low power detection process to determine when the wireless device is within range of a local wireless access point. In response to determining that the wireless device is within range of a wireless access point, the wireless device turns on a higher power wireless radio to communicate with the local wireless access point or switch between communications protocols from a first wireless communications protocol (e.g., CDMA) to a second wireless communications protocol (e.g., WiFi). Common wireless devices include cell phones, personal digital assistants (PDAs), laptops, computers, music players, cameras, handheld video games, electronic book, watches, and other similar devices. These wireless devices may be enabled to communicate using multiple wireless protocols. Each wireless protocol may have different power consumption characteristics.

In the illustrative embodiments of the present invention, a cell phone or other wireless device uses a low power signal to detect a signal using a first protocol (e.g., Bluetooth®), which is indicative of a signal using a second protocol (e.g., WiFi) being present. In response to determining that the wireless device is in range of the second signal, a higher power radio may be turned on to communicate with a network broadcasting that signal. By using the low power signal to detect or scan for other available networks, the wireless device is able to operate more efficiently and preserve battery power. Bluetooth and WiFi are used only as examples, any number of low-power and higher-power communications protocols may be used by the wireless device. The embodiments of the present invention may be applied to any wireless device that utilizes two or more radio communication protocols.

More specifically, and as a general description, a cell phone may be equipped with radios to communicate using both global system for mobile communications (GSM) and WiFi signals. Additionally, the cell phone may be configured with a radio to communicate using Bluetooth® communications. In one embodiment of the present invention, the cell phone communicates by default using GSM services that are standard for most cellular communications. While the cell phone is communicating using the GSM radio, the WiFi circuitry of the phone may be in a sleep mode so that power is not consumed searching for available WiFi networks. The cell phone may use the Bluetooth circuitry to listen for a Bluetooth signal indicating that a WiFi network or access point is available. A Bluetooth signal may be used because of the lower power consumption of the protocol. Other low power communications protocols may be utilized.

In response to the cell phone detecting the Bluetooth signal associated or linked with a WiFi network the cell phone may switch communications from the GSM services to the WiFi network The GSM circuitry of the phone may be switched into a sleep mode. The cell phone may switch to WiFi based on better service, lower cost, or user preferences. The Bluetooth signal broadcast from the access point may be detected from approximately the same range as the WiFi network so that the cell phone may initiate communication using the WiFi network once the Bluetooth protocol is detected. Similarly, the cell phone may return to GSM communications once the WiFi or Bluetooth connection is lost.

FIG. 1 is a pictorial representation of an exemplary wireless communications system 100 in accordance with the illustrative embodiments of the present invention. The wireless communications system 100 is an exemplary environment in which aspects of the present invention may be implemented. Wireless communications system 100 may include a wireless device 102 enabled to communicate voice and/or data. Communication as herein referenced describes transmitting, receiving, or listening for a communications signal. The wireless device 102 may send and receive signals using any number of communications protocols. In one embodiment, the wireless device 102 may broadcast signals 104, 106, and 108 having different communications protocols, $P_A$, $P_B$, and $P_C$. The signals 104, 106 and 108 may conventionally communicate over wireless links having different ranges, including ranges 110, 112, and 114, respectively. In accordance with the principles of the present invention, ranges 110 and 112 may be configured to be the same or relatively similar.

The range 110 may be representative of a local wireless area network that includes a subscriber home 116. The subscriber home 116 may be a home, business, school, or other building. The subscriber home 116 includes a wireless access point 118 with which the wireless device 102 may communicate to access a network. The wireless access point 118 may include radio 119 and 120 to communicate signals having communications protocols the same as signals 104 and 106. Alternatively, rather than using two radios, if the wireless device is equipped with an radio frequency identification (RFID) tag or circuit, an RFID tag reader 122 may be positioned at one or more entryways 124, thereby eliminating radio 119.

In one embodiment, the wireless device 102 is a multi or dual-mode cell phone enabled to broadcast using at least two communications protocols including CDMA, GSM, TDMA, WiFi, WiMAX, evolution data only (EVDO), and other existing and developing wireless voice and data protocols. The radios may communicate using communications protocols $P_A$ and $P_B$ within ranges 126 and 128, respectively. In one embodiment, radios 119 and 120 are configured to broadcast with the same or similar range.

In one embodiment, radio 119 may broadcast a low-power signal 130. A low power signal 130 is a wireless signal that uses the communications protocol $P_A$ that may be broadcasted and received from the wireless device 102 with lower power than a communications protocol used by network communications. In one example, communications protocol $P_A$ is Bluetooth®.

In one embodiment, communications protocol $P_B$ may be a protocol for transmitting data, such as WiFi or WiMAX. Communications protocol $P_C$ may be a protocol for transmitting a cellular or mobile signal, such as GSM, CDMA, TDMA, or other cellular protocols.

The wireless access point 118 may be a single integrated device incorporating radios 119 and radio 120. Alternatively, the wireless access point 118 may be a transceiver, circuitry, and antenna including radio 119 and similarly independent components including radio 120. In another embodiment, the wireless access point 118 including radio 119 and 120 may be controlled by a personal computer for granting access to signal 106 using communications protocol $P_B$ when a user enters the subscriber home 116.

The radios 119 and 120 may be configured to broadcast communications signals 130 and 132 to cover the subscriber home 116. In one embodiment, radio 119 may broadcast using more power or gain than is typically used for signal 104. For example, if signal 104 uses communications protocol $P_A$, such as Bluetooth, which typically has a range of a few feet, the power of radio 119 may be increased to cover the subscriber home 116 within a range 126 without much cost since, in this case, it is powered by a user's home and not from a battery that has drainage concerns. The wireless device 102 does not need to extend the range 110 of the signal 104, thereby conserving battery power of the wireless device 102 while being able to receive signals 130 within the subscriber home 116.

Detection of the signal 130 broadcast from the wireless access point 118 using communications protocol $P_A$ may indicate that the wireless access point 118 is also broadcasting signal 132 using communications protocol $P_B$. In one embodiment, the signal 130 broadcast from the wireless access point 118 using communications protocol $P_A$ may carry information that indicates to the wireless device 102 that the wireless access point 118 also allows communication using communications protocol $P_B$. In other words, the signals 130 and 132 using communications protocols $P_A$ and $P_B$ broadcast from the wireless access point 118 may be linked or associated to indicate information about one another. For example, data communicated over signal 130 is using communications protocol $P_A$ may specify channel, Internet Protocol addresses, passwords, or other information that the wireless device 102 uses in communicating with signal 132 using communications protocol $P_B$ from the wireless access point 118. However, in general, the wireless device 102 is configured to determine that it is within a range 128 of the local access point 118 by using a low power radio to detect signal 130 and switching from communicating using communications protocol $P_C$ to $P_B$ corresponding to signal 132. Switching may occur automatically or may switch in response to detecting the signal 130 from radio 119.

If the wireless device is configured with an RFID tag, then the use of an RFID tag reader 122 is capable of notifying the wireless device 102 that it is within the subscriber home 116. In response, the wireless device 102 may determine it is within range 128 of radio 120, and, therefore, may switch to communicate with radio 120 using communications protocol $P_B$ instead of communications protocol $P_C$. Switching between protocols may occur absent or during a voice conversation seamlessly, without substantial delay or disruption.

In the illustrative embodiments, a communications protocol that is low power is used by the wireless device 102 to detect proximity, availability, or location of the wireless access point 118. In one embodiment, the circuitry to broadcast signals 108 using communications protocol $P_C$ is, by default, active as well as the circuitry for communicating signals 104 using communications protocol $P_A$. During this time, circuitry for broadcasting signals 106 using communications protocol $P_B$ may be inactive or in sleep mode. In response to the wireless device 102 detecting a wireless network or accessibility to communications protocol $P_A$, the wireless device 102 may activate the circuitry for broadcasting using communications protocol $P_B$. The wireless device 102 may begin communicating using communications protocol $P_B$ and deactivate the circuitry for communicating using communications protocol $P_A$. As a result, the wireless device 102 conserves power by communicating using communications protocols $P_A$ and $P_C$ in a substantially mutually exclusive manner by using the lower power signals 104 with communications protocol $P_A$.

Figure 2:
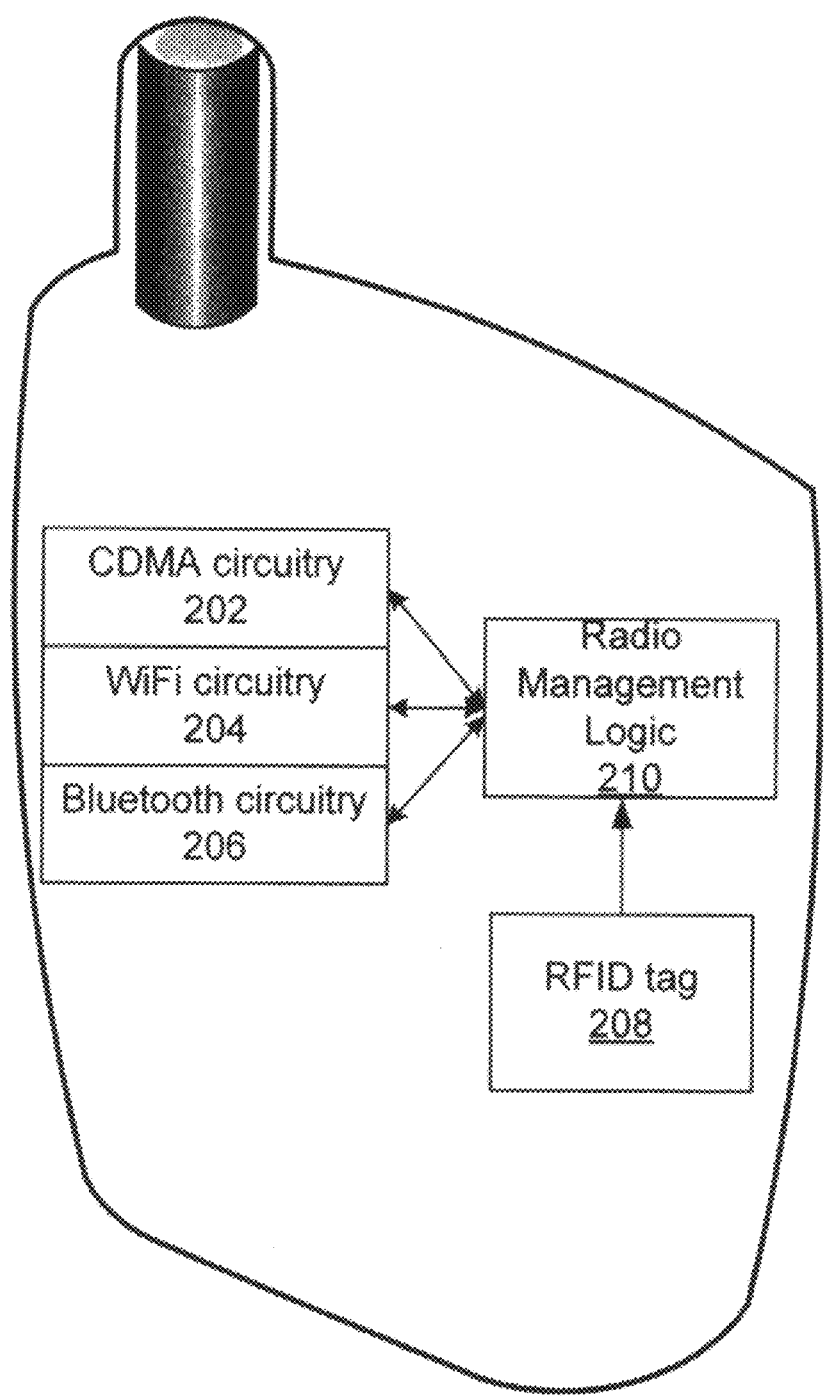
FIG. 2 is a block diagram of an exemplary wireless device in accordance with the illustrative embodiments of the present invention.

FIG. 2 is a block diagram of an exemplary wireless device 200 in accordance with the illustrative embodiments of the present invention. The wireless device 200 may include CDMA circuitry 202, WiFi circuitry 204, Bluetooth circuitry 206 and radio management logic 208. It should be understood that the wireless device 200 is a multi-mode cellular phone that may communicate using any number of cellular and wireless protocols with differing power and frequency configurations, settings, and requirements, and is not limited to CDMA, WiFi, and Bluetooth.

The CDMA circuitry 202 is the circuitry used by the wireless device 200 to communicate using cellular networks. The WiFi circuitry 204 is the circuitry used by the wireless device 200 to communicate a WiFi signal, such as 802.11g. The Bluetooth circuitry 206 is the circuitry used by the wireless device 200 to communicate a Bluetooth signal. The CDMA circuitry 202, the WiFi circuitry 204 and the Bluetooth circuitry 206 may include transceivers, antennas, amplifiers, digital logic, and other signal processing components for sending and receiving the wireless signals used by each component. As understood in the art, CDMA and WiFi are technologies used to communicate over networks and consume more power than Bluetooth technology.

The radio management logic 210 determines when and how the wireless device 200 communicates using a specified communications protocol. The radio management logic 210 may use default logic settings and user-defined preferences to activate, enable, disable or sleep the CDMA circuitry 202, WiFi circuitry 204, and Bluetooth circuitry 206. For example, in order to conserve power, the wireless device 200 may be configured to deactivate the CDMA circuitry 202 and communicate using the WiFi circuitry 204 when a WiFi signal is available. The WiFi circuitry 204 may also be used to conserve resources of the wireless service provider, such as available bandwidth, processing power, trunk lines, and mobile circuits. As a result, whenever the Bluetooth circuitry 206 detects a Bluetooth signal broadcast from or associated with a WiFi access point, the CDMA circuitry is deactivated and placed in sleep mode and the WiFi circuitry 204 is activated.

Alternatively, the user may be presented with an option to deactivate the CDMA circuitry 202 and activate the WiFi circuitry 204. The user may be prompted to select an option using a user interface and a touch screen, buttons, knobs, and other selection mechanisms of the wireless device 200. In such a configuration, the wireless device 200 may present the user with the option of switching between communications protocols, and perform the activation/deactivation of the CDMA circuitry 202 and WiFi circuitry 204 based on a user selection. The radio management logic 210 may determine which circuits are active or enabled at any given time.

For example, the Bluetooth circuitry 204 may be active to locate WiFi networks for the WiFi circuitry 204 when the CDMA circuitry 202 is active. In another example, the Bluetooth circuitry 204 may actively search for a Bluetooth signal that indicates a WiFi network is accessible by the wireless device 200. Once the WiFi signal is located, the Bluetooth circuitry 206 may continue to verify that the Bluetooth signal is present. In response to losing the Bluetooth or WiFi signal, the radio management logic 210 may reactivate the CDMA circuitry 202 from sleep mode and deactivate the WiFi circuitry 204.

The radio management logic 210 may ensure that any ongoing voice conversations, text messenger, or other voice or data communications are retained, sent, or resent to ensure that switching between circuits is undetectable to the user. For example, if a user is using the wireless device 200 to carry on a voice conversation using the CDMA circuitry 202 when the Bluetooth circuitry 206 detects a signal, the radio management logic 210 ensures that the voice conversation continues using the WiFi circuitry 204 without significant interruption. Of course, the CDMA and WiFi networks have infrastructure to manage such communications switchovers, as understood in the art.

Figure 3:
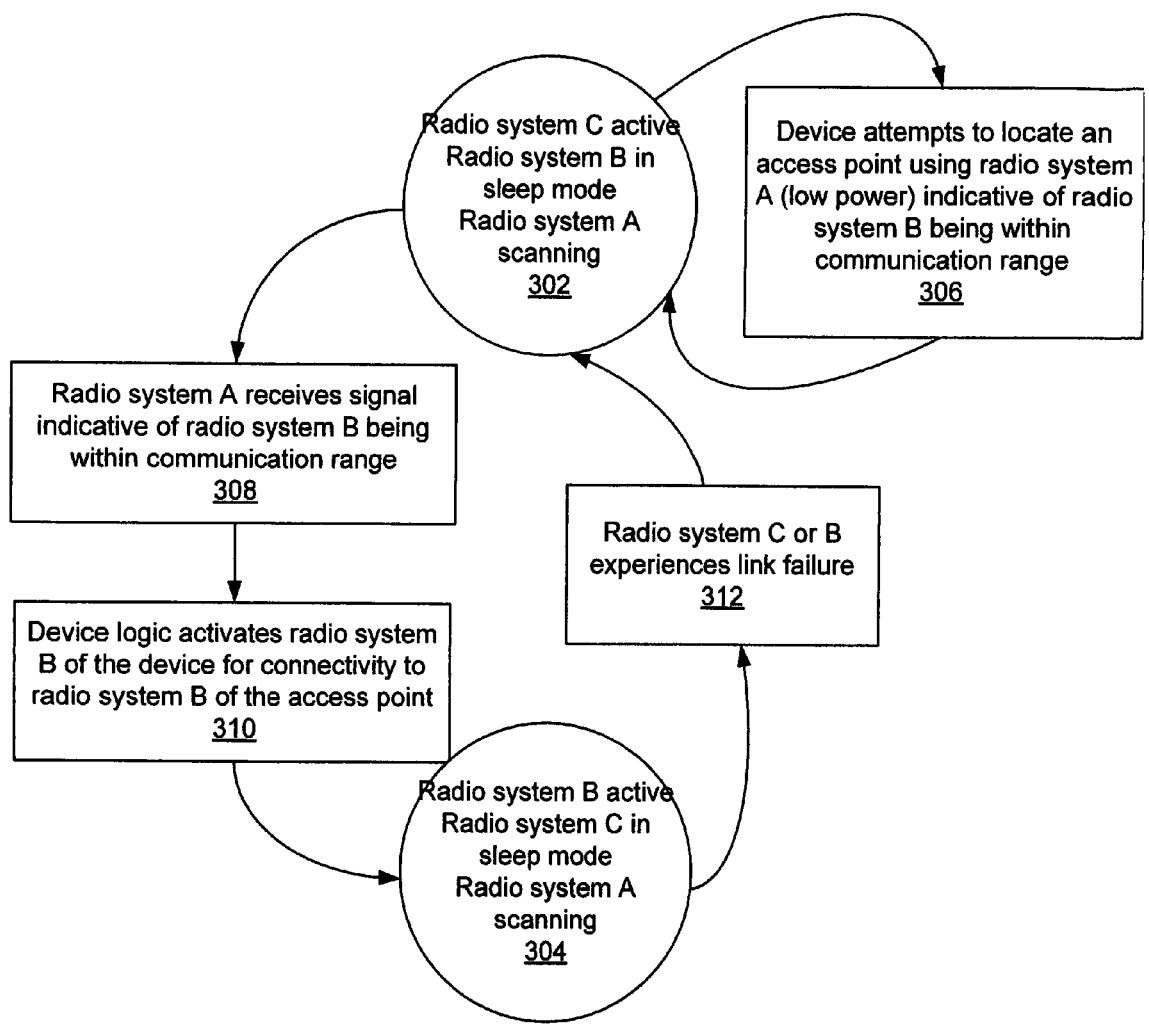
FIG. 3 is a state diagram of an exemplary method for switching between communications protocols in accordance with the illustrative embodiments of the present invention.

FIG. 3 is a state diagram of an exemplary method for switching a wireless device between communications protocols in accordance with the illustrative embodiments of the present invention. State diagram 300 includes two states 302 and 304 and various steps 306, 308, 310 and 312 that lead to transition between the states 302 and 304. In state 302, radio system C is active, radio system B is in sleep mode and radio system A is scanning (state 302). In state 304, radio system B is active, radio system C is in sleep mode, and radio system A is scanning (state 304).

At state 302, the wireless device attempts to locate an access point using radio system A, which communicates using a low power communications protocol (e.g., Bluetooth), indicative of radio system B being within communication range (step 306). The wireless device remains in state 302 so long as an access point is not detected.

The wireless device begins to transition states when radio system A receives a signal indicative of radio system B being within communication range (step 308). In other words, the presence of radio system A as detected by the wireless device indicates that a wireless access point is available. Next, within the wireless device, device logic activates radio system B of the device for connectivity to radio system B of the access point (step 310). After steps 308 and 310, the wireless device transitions to state 304. The wireless device remains in state 304 until radio system A or B experiences link failure (step 312). The wireless device returns to state 302 in response to link failure of radio system A or B. In one embodiment, the signals of radio systems A and B broadcast from the wireless access point to similar ranges so that link failure occurs at approximately the same time. Alternatively, radio system B may communicate with a longer range to give the wireless device additional time to switch communications protocols.

FIG. 4 is a flowchart of an exemplary process for switching between communications protocols in accordance with the illustrative embodiments of the present invention. The process of FIG. 4 may be implemented by a multi-function cell phone or other wireless device. The process of FIG. 4 begins with radio system A active on the wireless device and radio system C being in a state of attempting to connect to an access point (step 402). In one example, radio system A is a default communication system, such as GSM or CDMA of a multi-mode cellular phone. Radio system B may be a data communication signal, such as WiFi, and radio system C is a low power signal, such as Bluetooth.

Next, the radio system C detects the presence and proximity information to radio system B from an access point (step 404). However, radio system C may also extract information from the signal that indicates detailed presence, type, speed, proximity, and other communication information to radio system B.

Next, radio system B of the wireless device connects to radio system B of the access point and puts radio systems A and C in a deep sleep mode (step 406). In step 406, the wireless device establishes a communication session using radio system B based on availability. The wireless device communicates using radio system B (step 408). In response to the connectivity failing between radio system B of the wireless device and access point (step 410), the process returns to step 402.

Figure 5A:
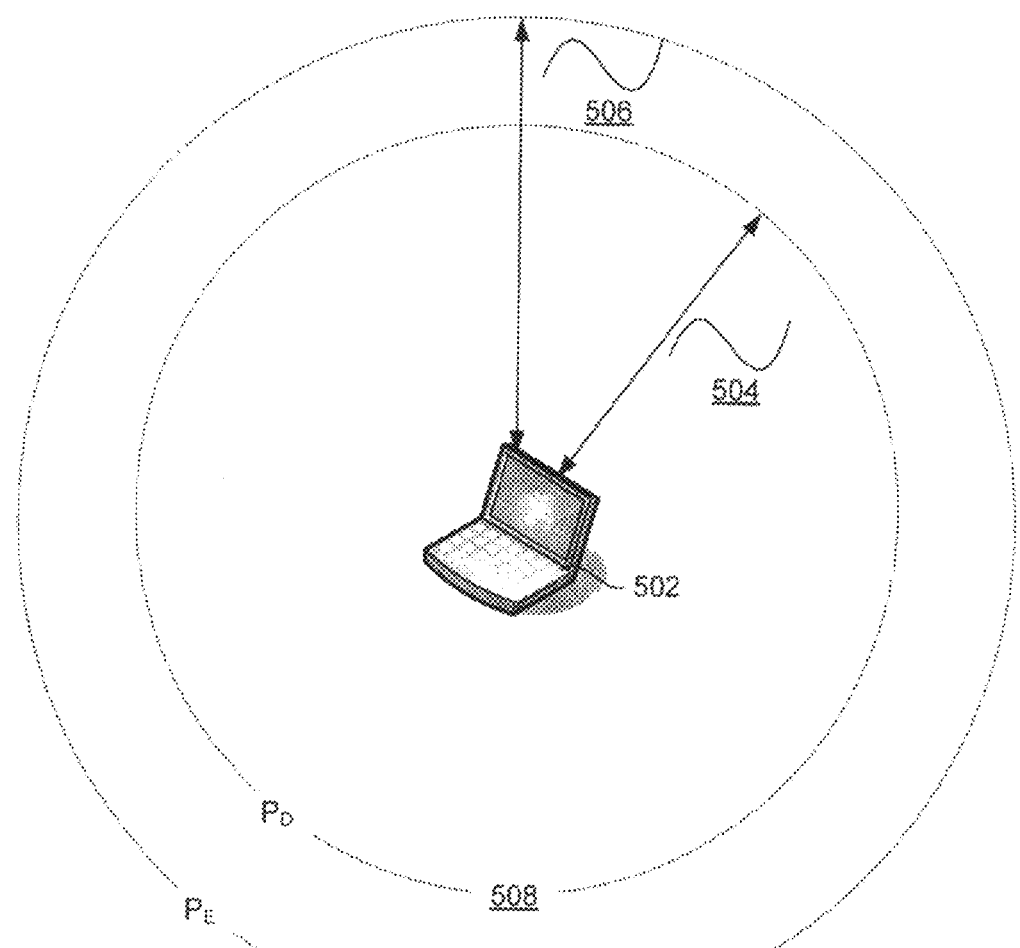
FIGS. 5A-5B are a pictorial representation of communications of an exemplary wireless device in accordance with the illustrative embodiments of the present invention.
Figure 5B:
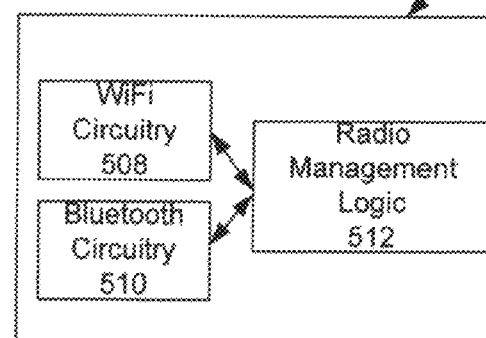

FIGS. 5A-5B are pictorial representations of exemplary communications of a wireless device in accordance with the illustrative embodiments of the present invention. In this embodiment, wireless device 502 is a laptop computer that has one wireless communications protocol for communicating with a wireless network. Other wireless devices having one communications protocol may similarly utilize the principles of the present invention. The wireless device 502 of FIG. 5A communicates using a signal 504 using communications protocol $P_D$, and a signal 506 using communications protocol $P_E$. The effective communication range of communications protocols $P_D$ and $P_E$ are ranges 508 and 510, respectively, and may differ as shown or may be approximately the same or may vary based on circumstances, such as need, user preferences, battery power, and environmental factors.

As shown, wireless device 502 may be a laptop equipped with wireless transceivers. For example, communications protocol $P_D$ may be a Bluetooth protocol and communications protocol $P_E$ may be a WiFi protocol. Additionally, wireless device 502 may be equipped to send and receive voice and data signals using any number of other wireless technologies and protocols.

In FIG. 5B, wireless device 502 includes WiFi circuitry 508, Bluetooth circuitry 510, and radio management logic 512. The radio management logic 512 may be tied to a memory and processor of the wireless device 502 for determining when to enable, disable, or communicate using the WiFi circuitry 508 and the Bluetooth circuitry 510. By using the Bluetooth circuitry 508 to listen for the Bluetooth signal rather than listening with the WiFi circuitry 508, battery power is conserved because WiFi circuitry 508 consumes more power than Bluetooth circuitry 510.

Figure 6:
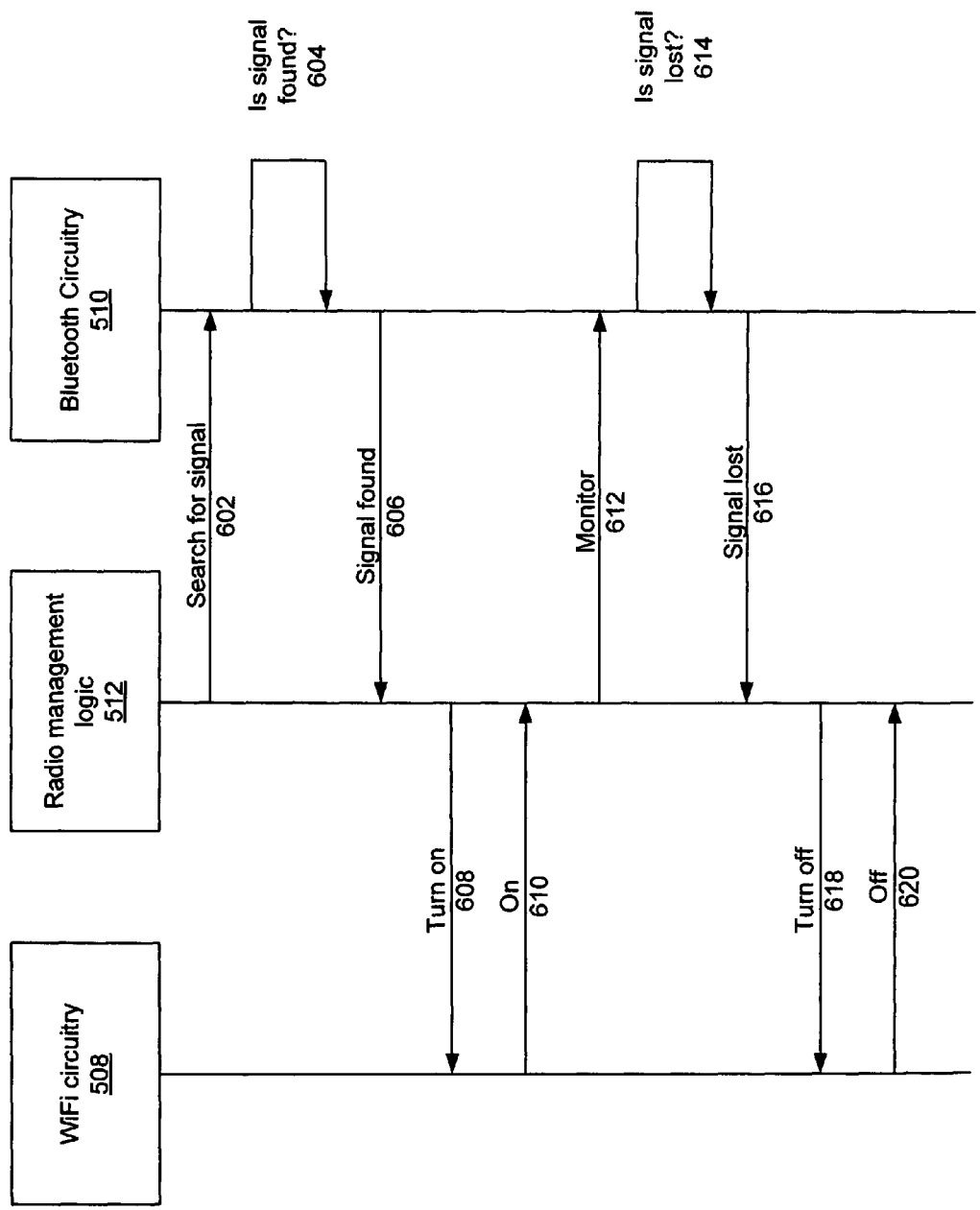
FIG. 6 is an interaction diagram of an exemplary wireless device in accordance with the illustrative embodiments of the present invention.

FIG. 6 is an interaction diagram of an exemplary process for managing circuitry within a wireless device in accordance with the illustrative embodiments of the present invention. First, the radio management logic 512 searches for a signal at step 602. The Bluetooth circuitry continuously searches to determine whether the signal is found at step 604.

Once the signal is found at step 606, the radio management logic 512 turns on the WiFi circuitry 508 at step 610. The radio management logic 512 may monitor the signal at step 612. The Bluetooth circuitry 510 determines whether the signal is lost at step 614. In response to the Bluetooth circuitry 510 determining the signal is lost, the radio management logic 512 is notified at step 616 and turns off the WiFi circuitry to conserve battery power and available resources at step 618. The WiFi circuitry 508 notifies the radio management logic 512 that it is turned off at step 620. Interactions described by the interaction diagram 600 may be repeated continuously and/or alternatively be reordered.

The previous detailed description is of a small number of embodiments for implementing the invention and is not intended to be limiting in scope. One of skill in this art will immediately envision the methods and variations used to implement this invention in other areas than those described in detail. The following claims set forth a number of the embodiments of the invention disclosed with greater particularity.

What is claimed is:

1. A wireless device comprising:
a first radio, a second radio, and a third radio, the radios configured to communicate using a first, a second, and a third communications protocol, respectively;
circuitry in communication with the radios and configured to activate the first radio when a signal using the second communications protocol is not detected and to switch activation of the first radio to the third radio in response to detecting the signal using the second communications protocol, wherein the second radio is configured to detect the signal using the second communications protocol at a first range from an access point; and
wherein the third radio is also configured to communicate signals using the third communications protocol at approximately the first range from the access point, the access point configured to communicate both the signal using the second communications protocol and the signals using the third communications protocol.

2. The wireless device according to claim 1, wherein the circuitry is further configured to reactivate the first radio in response to losing detection of the signal using the second communications protocol.

3. The wireless device according to claim 1, wherein detection of the second communications protocol indicates that the third communications protocol is also present.

4. The wireless device according to claim 1, wherein the first radio communicates with a cellular network using the first communications protocol.

5. The wireless device according to claim 1, wherein the first radio and third radio are in a sleep mode when not in use to conserve battery power of the wireless device.

6. The wireless device according to claim 1, wherein the third radio communicates using a WiFi communications protocol.

7. The wireless device according to claim 1, wherein the second radio is configured to receive Bluetooth communications protocol signals.

* * * * *